United States Patent
Contreras et al.

(10) Patent No.: US 6,823,299 B1
(45) Date of Patent: Nov. 23, 2004

(54) MODELING OBJECTS, SYSTEMS, AND SIMULATIONS BY ESTABLISHING RELATIONSHIPS IN AN EVENT-DRIVEN GRAPH IN A COMPUTER IMPLEMENTED GRAPHICS SYSTEM

(75) Inventors: Alfredo Contreras, Helotes, TX (US); Jeffrey Alan White, Austin, TX (US); William Bradley Williams, Austin, TX (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/349,165

(22) Filed: Jul. 9, 1999

(51) Int. Cl.$^7$ ............................................. G06F 9/44
(52) U.S. Cl. ..................... 703/14; 703/17; 703/26; 703/27; 345/419
(58) Field of Search ..................... 703/14, 17, 26, 703/27; 345/419, 440, 428, 430, 441; 717/104, 140

(56) References Cited

U.S. PATENT DOCUMENTS

| | | | | |
|---|---|---|---|---|
| 5,408,597 A | * | 4/1995 | Kita et al. | 364/710.01 |
| 5,487,146 A | * | 1/1996 | Guttag et al. | 395/166 |
| 5,590,249 A | * | 12/1996 | Hanaoka | 395/122 |
| 5,896,139 A | * | 4/1999 | Strauss | 345/440 |
| 5,929,864 A | * | 7/1999 | Picott et al. | 345/440 |
| 5,953,506 A | * | 9/1999 | Kaltra et al. | 395/200.61 |
| 6,128,587 A | * | 10/2000 | Sjolander | 703/2 |
| 6,154,723 A | * | 11/2000 | Cox et al. | 704/270 |
| 6,215,495 B1 | * | 4/2001 | Grantham et al. | 345/419 |
| 6,263,103 B1 | * | 7/2001 | Freeman et al. | 382/173 |
| 6,266,053 B1 | * | 7/2001 | French et al. | 345/302 |
| 6,393,386 B1 | * | 5/2002 | Zager et al. | 703/25 |
| 2002/0093541 A1 | * | 7/2002 | Schileru-Key | |

* cited by examiner

*Primary Examiner*—Thai Phan
(74) *Attorney, Agent, or Firm*—Gates & Cooper LLP

(57) ABSTRACT

A computer-implemented graphics system defines an object-oriented framework for describing three-dimensional (3D) graphical objects, systems, and simulations. A 3D graphical image, a system, and a simulation are implemented as a directed multi-graph that includes a plurality of components defined by nodes connected by edges. A directed multi-graph engine in a graphics computer program processes the directed multi-graphs, wherein each node in the graph performs some specific function and the edges define relationships between the nodes. There are no restrictions on node types, and thus nodes may represent graphic objects (a visual representation), rules (rule-base behavior), attributes (data that does not affect the fundamental definition of the object), properties (data that affects the fundamental definition of the object), behaviors (methods), finite state machines (a sequence of actions and states), and any other user-defined component. There are no restrictions on edge types, and thus edges may represent event filters, connectivity, data, constraints, and any other user-defined relationship. Events traverse the graph, wherein the edges determine if and how traversal of the nodes is performed and any node may perform some sequence of operations in response to this traversal and the state of the graph.

39 Claims, 8 Drawing Sheets

MODELING OBJECTS, SYSTEMS, AND SIMULATIONS BY ESTABLISHING RELATIONSHIPS IN AN EVENT-DRIVEN GRAPH IN A COMPUTER IMPLEMENTED GRAPHICS SYSTEM

BACKGROUND OF THE INVENTION

1. Field of the Invention

The present invention relates generally to computer-implemented graphics systems, and in particular, to a method, apparatus, and article of manufacture for modeling objects, systems, and simulations by establishing relationships in an event-driven graph in a computer-implemented graphics system.

2. Description of the Related Art

Computer-implemented graphics systems have been widely used by designers, illustrators, drafters, and engineers for a number of years. In most computer-implemented graphics systems, there are objects such as solids, polylines and blocks meant to represent "real world" objects.

Modern 3D graphics systems allow users to create and animate increasingly sophisticated images. However, 3D graphics systems remain a challenging topic for computer graphics and computer-aided design (CAD), because few systems offer much sophistication. This is mainly due to the fact that developing 3D graphics systems has traditionally been a tedious, time-consuming, and difficult task requiring a high level of expertise by the programmer. As a result, most systems suffer from being the "lowest common denominator".

Moreover, most 3D graphics systems provide very simple interfaces to end-users and application developers. For example, they may provide a set of drawing commands that can be used to create visual representations of modeled 3D objects and simulations, but they rarely allow end-users or application developers to exploit any correlation between modeled objects and object-oriented programming techniques. While some object-oriented techniques are available, they do not go far enough. Consequently, there is a need in the art for 3D graphics systems that provide an improved object-oriented programming environment accessible to end-users and application developers.

SUMMARY OF THE INVENTION

To address the requirements described above, the present invention discloses a computer-implemented method, apparatus, and article of manufacture defining an object-oriented framework for describing three-dimensional (3D) graphical objects, systems, and simulations. An object, system, or simulation is implemented as a directed multi-graph that includes one or more nodes connected by zero or more edges. A directed multi-graph engine in a graphics computer program processes the directed multi-graphs, wherein each node in the graph provides specific functionality as it defines a component of an object, system, or simulation, and the edges define the relationships between the nodes. There are no restrictions on node types, and thus nodes may represent graphic objects (a visual representation), rules (rule-base behavior), attributes (data that does not affect the fundamental definition of the object), properties (data that affects the fundamental definition of the object), behaviors (methods), finite state machines (a sequence of actions and states), and user-defined node types. There are no restrictions on edge types, and thus edges may represent event filters, connectivity graphic and logical), data, constraints, and user-defined edge types. Events traverse the graph, wherein edges determine if and how traversal of the nodes is performed, and any node may perform some sequence of operations in response to this traversal and the state of the graph.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, byway of illustration, an embodiment of the present invention. It is understood that other embodiments may be utilized and structural changes may be made without departing from the scope of the present invention.

Overview

The present invention defines an object-oriented framework for describing 3D graphical objects, systems, and simulations as directed multi-graphs, each of which includes one or more nodes connected by zero or more edges. A directed multi-graph engine processes the directed multi-graphs, wherein each node in the graph defines a component of an object, system, or simulation, and the edges define relationships between the nodes. Nodes provide specific functionality and thus may represent graphic object components (a visual representation), rule components (rule-base behavior), attribute components (data that does not affect the fundamental definition of the object), property components (data that affects the fundamental definition of the object), behavior components (methods), finite state machine components (a sequence of actions and states), and other user-defined components. Edges may represent event relationships, connectivity relationships (graphic and logical), data relationships, constraint relationships, and other user-defined relationships. Edges determine if and how events traverse the graph and the nodes may perform some sequence of operations in response to the traversal of the event and the state of the graph.

Hardware and Software Environment

Figure 1:
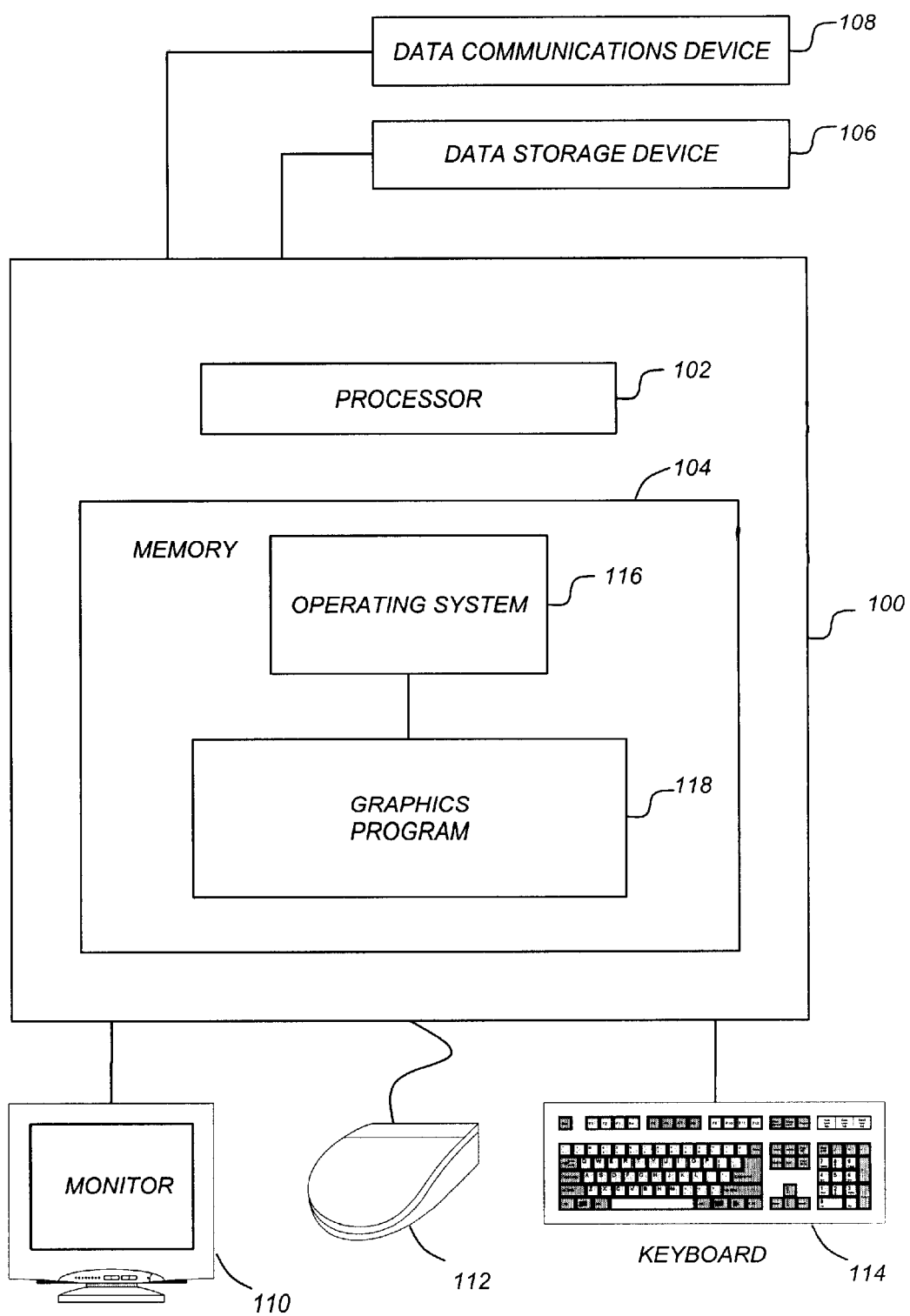
FIG. 1 is an exemplary hardware environment used to implement the preferred embodiment of the invention.

FIG. 1 is an exemplary hardware and software environment used to implement the preferred embodiment of the invention. The preferred embodiment of the present invention is typically implemented using a computer 100, which generally includes, inter alia, a processor 102, random access memory (RAM 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The computer 100 usually operates under the control of an operating system 116. The preferred embodiment of the present invention is implemented by computer-implemented graphics program 118 that operates under the control of the operating system 116.

However, it should be understood that, in the alternative, the present invention may also apply to other computer programs or to specific utilities or functions performed within the operating system 116 itself. In general, the functions performed in the present invention, whether implemented as part of an operating system 116 or a specific computer program 118, will be referred to herein as "computer programs".

Generally, the operating system 116 and graphics program 118 comprise logic and/or data embodied in or readable from a device, media, or carrier, e.g., one or more fixed and/or removable data storage devices 106 connected directly or indirectly to the computer 100, one or more remote devices coupled to the computer 100 via the data communications devices 108, etc.

Those skilled in the art will recognize that the exemplary environment illustrated in FIG. 1 is not intended to limit the present invention. Indeed, those skilled in the art will recognize that other alternative environments may be used without departing from the scope of the present invention.

Computer-Implemented Graphics Program

Figure 2:
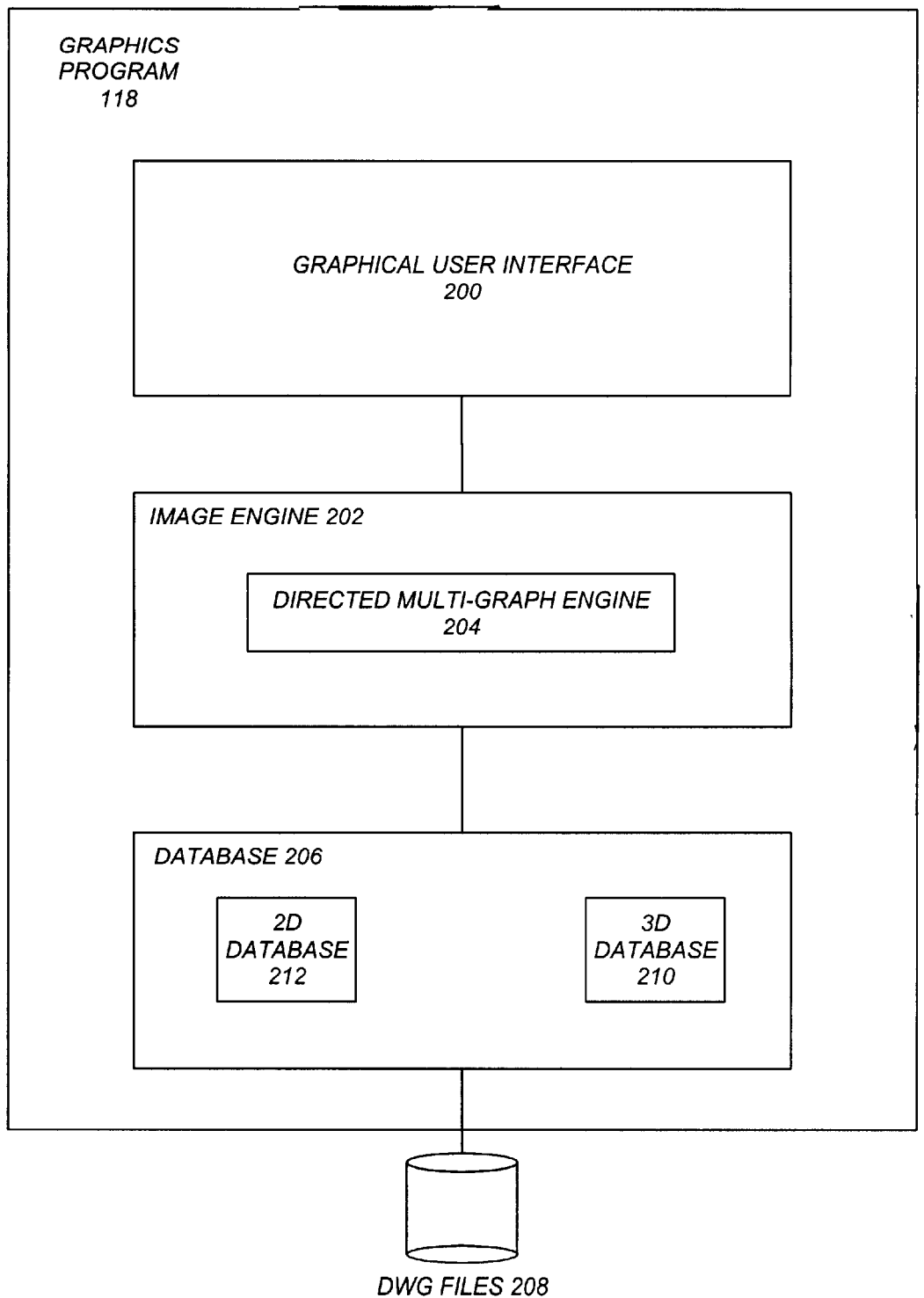
FIG. 2 is a block diagram that illustrates the components of the computer-implemented graphics program according to the preferred embodiment of the present invention.

FIG. 2 is a block diagram that illustrates the components of the graphics program 118 according to the preferred embodiment of the present invention. There are three main components to the graphics program 118, including: a Graphical User Interface (GUI) 200, an Image Engine (IME) 202 including a Directed Multi-Graph (DMG) engine 204, and a database (DB) 206 for storing objects in Drawing (DWG) files 208.

The Graphical User Interface 200 displays information to the user and provides the functionality for the user's interaction with the graphics program 118.

The Image Engine 202 processes the Database 206 and delivers the resulting graphics to an output device. In the preferred embodiment, the Image Engine 202 provides a complete application programming interface (API) that allows other computer programs to interface to the graphics program 118 as needed.

The Directed Multi-Graph engine 204 is used to store and execute graphs using containers, wherein the graphs use events to access and propagate changes through the graph. In the preferred embodiment, the Directed Multi-Graph engine 204 also includes an application programming interface (API) that is accessible to both objects and other computer programs.

The Database 206 is comprised of two separate types of databases: (1) a 3D database 210 known as the "world space" that stores 3D information; and (2) one or more 2D databases 212 known as the "virtual spaces" or "view ports" that stores 2D information derived from the 3D information. The 3D database 210 stores dynamic representations of 3D graphical images as graphs (typically directed graphs) of objects called nodes that are connected by edges.

Object Structure

Figure 3:
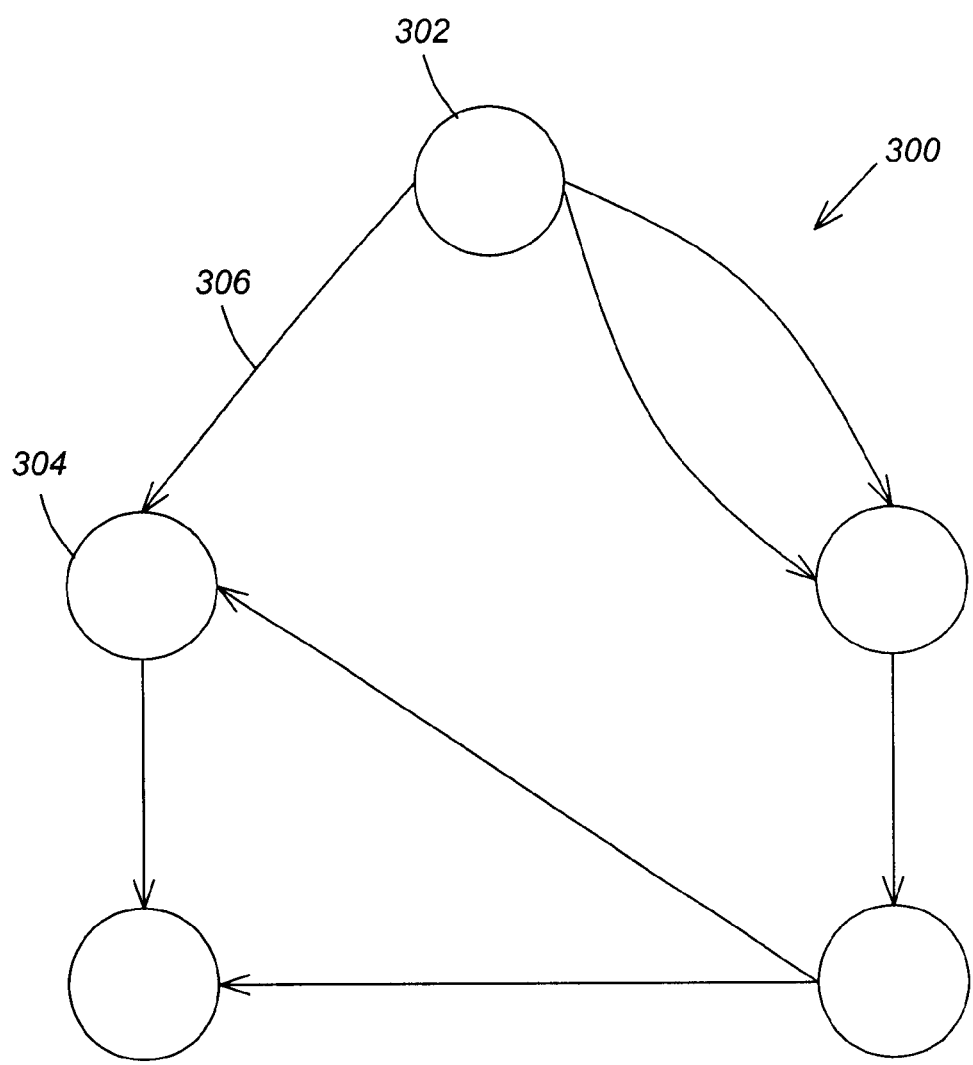
FIG. 3 is a block diagram that illustrates the structure of an object maintained by each of the three-dimensional databases of the computer-implemented graphics program according to the preferred embodiment of the present invention.

FIG. 3 is a block diagram that illustrates the structure of an object graph 300 maintained by the 3D database 210 according to the preferred embodiment of the present invention. Each object graph 300 includes a header node 302 and usually comprises a directed multi-graph comprised of one or more nodes 304 connected by zero or more edges 306. There may be any number of different object graphs 300 maintained by the 3D database 210. Moreover, a node 304 may be a member of multiple object graphs 300 in the 3D database 210.

Nodes, Edges, Events, and Graphs

Each node 304 in a graph 300 defines a component designed to perform some specific function of an object, system, or simulation. There are no restrictions on node 304 types, and thus they may represent graphic objects (a visual representation), rules (rule-base behavior), attributes (data that does not affect the fundamental definition of the object), properties (data that affects the fundamental definition of the object), behaviors (methods), finite state machines (a sequence of actions and states), and user-defined types. A node 304 may inherit properties from its parent node 304.

An edge 306 connects two nodes 304 in one direction into a graph 300 and defines a relationship between the nodes 304. Each edge 306 determines whether and how traversal of the nodes 304 is performed, and whether and how node 304 properties are inherited. There are no restrictions on edge 306 types, and thus they may represent classes or groups, such as event filters, connectivity, data, and constraints.

Events traverse graphs 300 and any node 304 may change state and may perform some sequence of operations in response to the event and the current state of the node 304, the object being defined, the system, or the simulation. Essentially, events may trace zero or more edges 306 from node 304 to node 304. Events may be initiated externally (from an application/user) or internally (from any node 304).

The present invention is designed to be extensible. It is assumed that users will often extend the set of node 304 types, and thus they may create new components, such as new graphic objects, rules, attributes, properties, behaviors, and finite state machines. It is also assumed that users will extend the set of edge 306 types, and thus they may create new relationships, such as event filters, connectivity, data, and constraints.

Figure 4A:
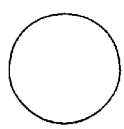
FIGS. 4A, 4B, 4C, 4D, and 4E are block diagrams that illustrate valid graphs according to the preferred embodiment of the present invention.
Figure 4B:
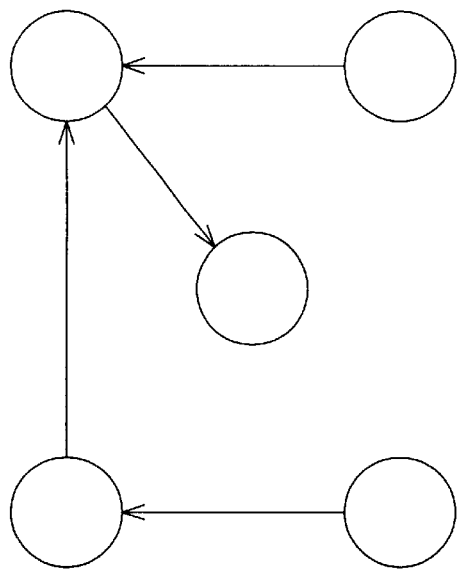
Figure 4C:
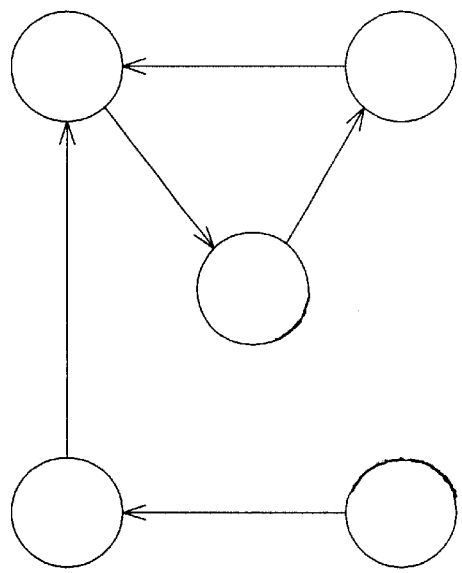
Figure 4D:
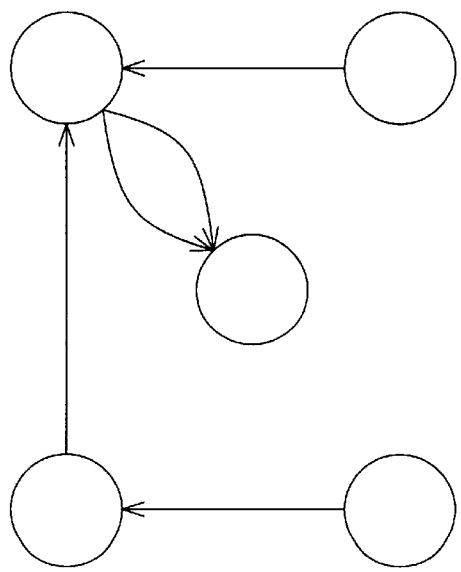
Figure 4E:
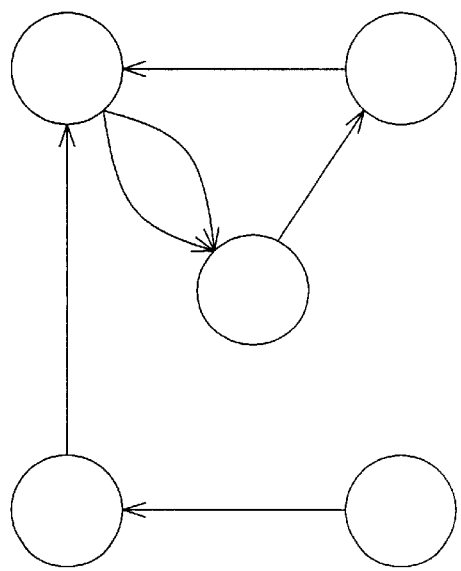

FIGS. 4A–4E illustrate a number of different graphs that may be created according to the preferred embodiment of the present invention. In FIG. 4A, a "simple graph" is a graph comprised of only one node and no edges. In FIG. 4B, a "directed graph" is a graph comprised of a plurality of nodes and edges, where the edges have a direction. In FIG. 4C, a "cyclic directed graph" is a graph comprised of a plurality of nodes and edges, where the edges have a direction and the edges may "cycle" back to a previous node. In FIG. 4D, a "multi-graph" is a graph comprised of a plurality of nodes and edges, where the edges have a direction and more than one edge is allowed between the same two nodes in the same direction. In FIG. 4E, a "cyclic multi-graph" is a graph comprised of a plurality of nodes and edges, where the edges have a direction, more than one edge is allowed between the same two nodes in the same direction, and edges may "cycle" back to a previous node.

Graphs and Finite State Machines

In the preferred embodiment, the DMG Engine 204 is a generalized modeling engine that interprets and/or executes directed multi-graphs 300 comprised of nodes 304 and edges 306.

The present invention defines an object-oriented framework for describing three-dimensional (3D) graphical objects, systems, and simulations where nodes 304 define components designed to perform specific functions of objects, systems, and simulations. Specifically, the present invention implements a directed multi-graph 300 framework to model objects, systems, and simulations in a graphics computer program, where component nodes 304 are created, manipulated, and destroyed at runtime. Additionally node-to-node relationships in the graph 300 are also established at runtime as the graph 300 changes. One of the unique aspects of this model is that nodes 304 may represent graphic objects, behaviors, rules, properties, and attributes and other user-defined types. Nodes 304 can also define finite state machines, and the relationships between nodes 304 and their responses to events can be driven by state changes.

The present invention supports the traditional method of creating an object class by allowing any node 304 derived from its node 304 base to exist in the graph 300. Additionally, it allows nodes 304 acting as components of an object class to be added to the graph 300 or removed from the graph 300 dynamically at runtime. And, like traditional object classes, these node 304 classes can be subclassed or derived from other node 304 classes to implement new nodes 304. The relationship between nodes 304 and other nodes 304 is established at runtime, therefore allowing the user to add, remove, and modify components of an object class "on the fly". The present invention will thus allow a wider range of complex applications to be developed for CAD, 3D visualization, and the Internet.

Further, each of the directed multi-graphs 300 may define one or more event-driven finite state machines. Thus, when the DMG Engine 204 interprets and/or executes directed multi-graphs 300, it interprets and/or executes event-driven finite state machines. Moreover, the directed multi-graphs 300 are recursive in that any node 304 can itself be a directed multi-graph 300 that may comprise a finite state machine. Finally, the relationships between nodes 304 in the directed multi-graphs 300, as well as the responses of the nodes 304 to events, can be driven by state changes of the nodes 304, state changes of the finite state machines, state changes of the systems, and state changes of the simulations.

Figure 5A:
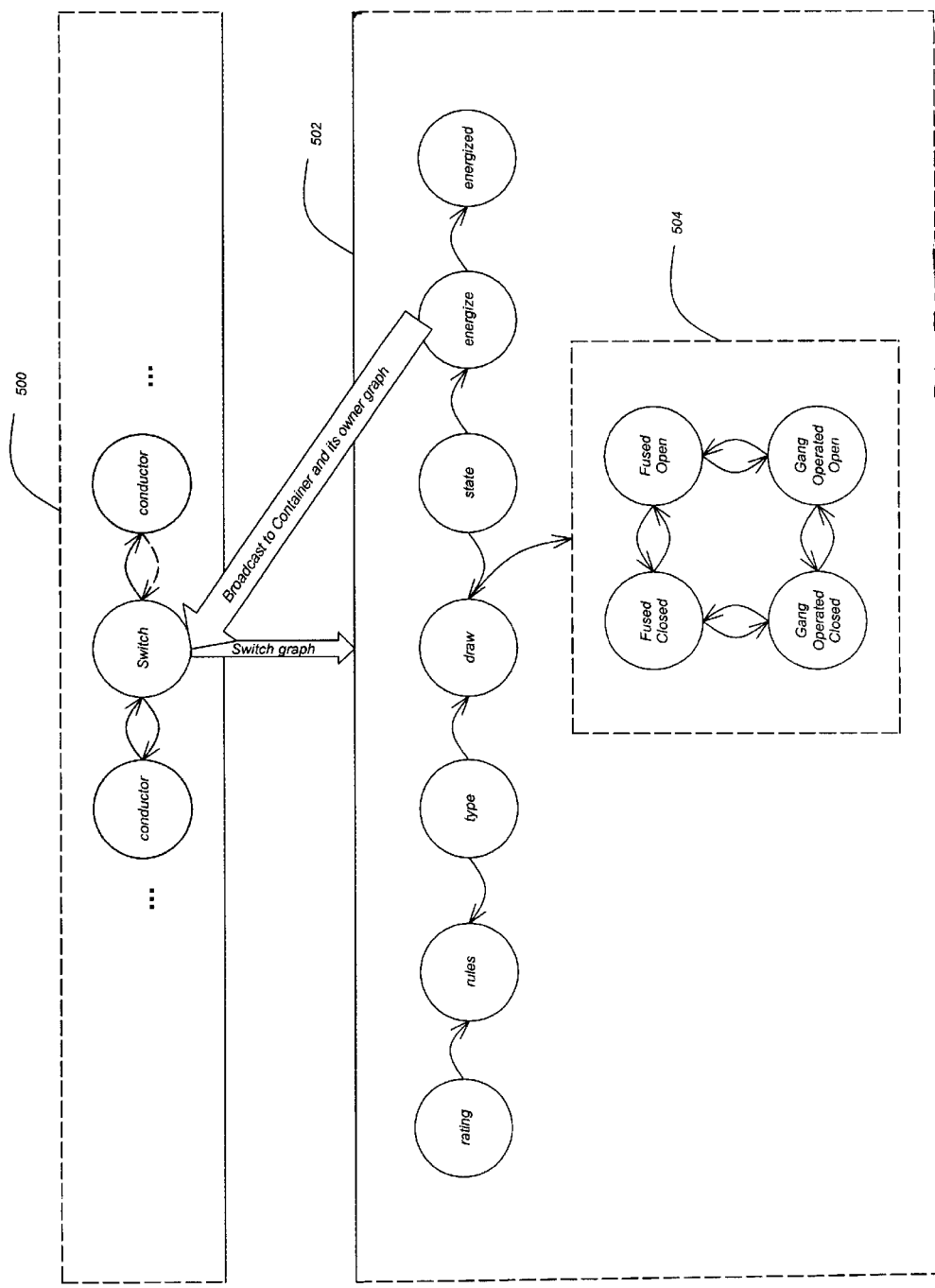
FIGS. 5A and 5B are block diagrams that illustrate objects, systems, and simulations in a graph in the computer-implemented graphics program according to the preferred embodiment of the present invention.

FIG. 5A illustrates how the DMG Engine 204 is used to store and manipulate graphs using "object" based containers. In this example, a primary graph 500 is a directed multi-graph that is comprised of multiple graphic nodes, including at least a switch and two conductors. The graphic nodes are connected by edges that represent associative and connectivity relationships between the nodes. Events are broadcast along the edges.

A graphic node in the primary graph 500 may itself comprise a directed multi-graph (in essence, a sub-graph). For example, the switch node in FIG. 5A comprises a directed multi-graph 502 having a number of different nodes connected by edges. These nodes in the directed multi-graph 502 may include graphic nodes (such as conductor and switch), rule nodes (such as rules), attribute nodes (such as energized and state), property nodes (such as rating and type), behavior nodes (such as energize), finite state machine model nodes (such as draw), and finite state machine definition nodes (such as fused closed, fused open, gang operated open, and gang operated closed). Behavior nodes (such as energize) may broadcast to the "container" switch node and its owner graph 500. Finite state machine model nodes (such as draw) may include edges that connect the node to another node representing the state of the finite state machine model 504.

Figure 5B:
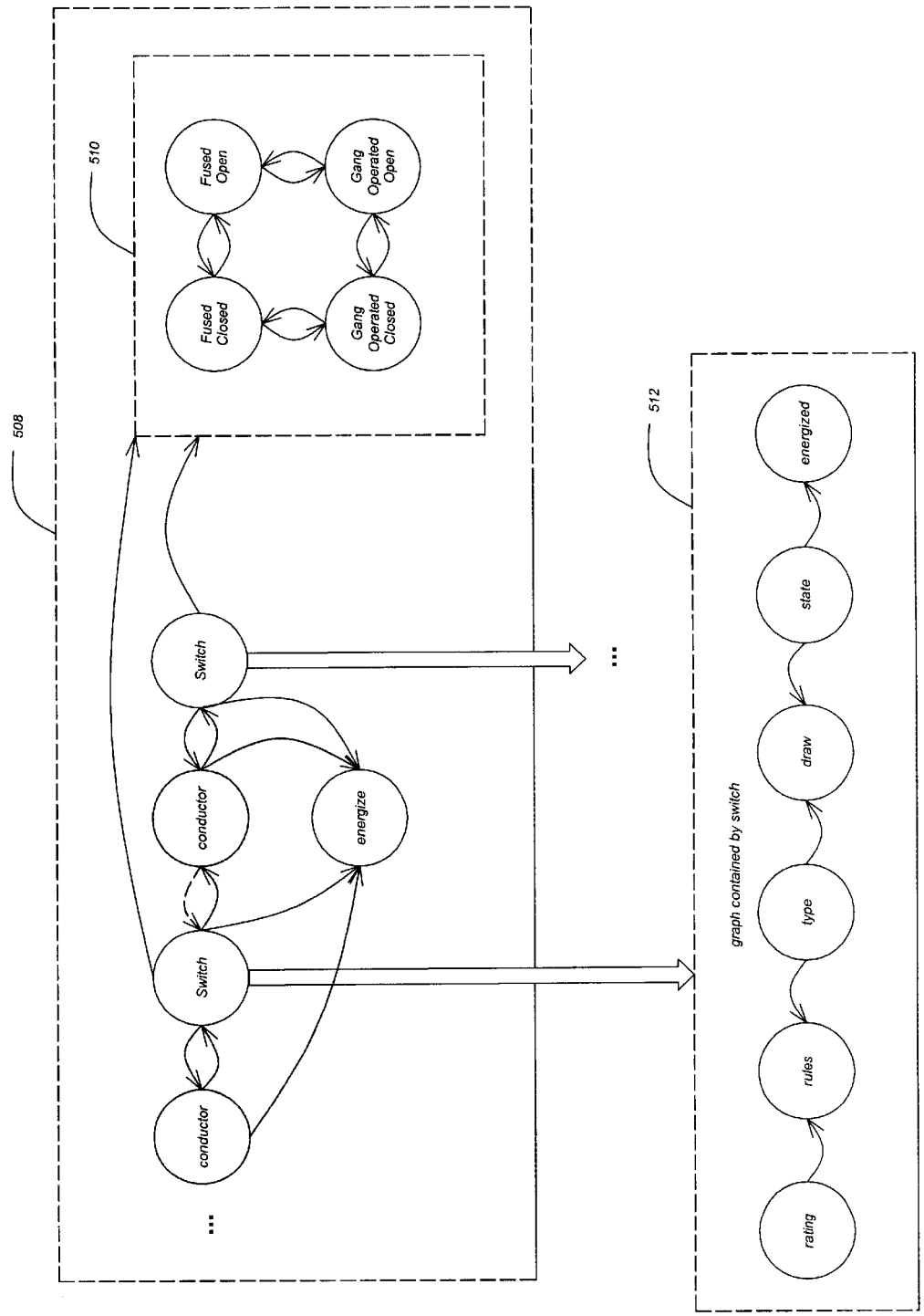

FIG. 5B illustrates how the DMG Engine 204 is used to store and manipulate graphs using "property" based containers. The properties in each primary graph 508 node may be another DMG. This particular graph uses "iteration" to access and change the graph 508.

In this example, a primary graph 508 is a directed multi-graph that is comprised of graphic nodes (such as switch and conductor), behavior nodes (such as energize), and finite state machine definition nodes (such as fused closed, fused open, gang operated open, and gang operated closed). The graphic nodes are connected by edges that represent states of a finite state machine. In addition, edges connect the conductor nodes to the energize node. Finally, an edge connects the switch node to the finite state machine definition node 510.

Each of the switch nodes in the primary graph 508 is a directed multi-graph 512 (in essence, a sub-graph). The directed multi-graph 512 includes a number of different nodes connected by edges. These nodes may include rule nodes (such as rules), attribute nodes (such as energized and state), property nodes (such as rating and type), and finite state machine nodes (such as draw).

Note that FIGS. 5A and 5B show the same graph stored in two different ways, and accessed in different ways as well. Although these figures illustrate two of the ways to store the same graph, others embodiment exist as well, which indicates the flexibility of the present invention.

EXAMPLES

Figure 6:
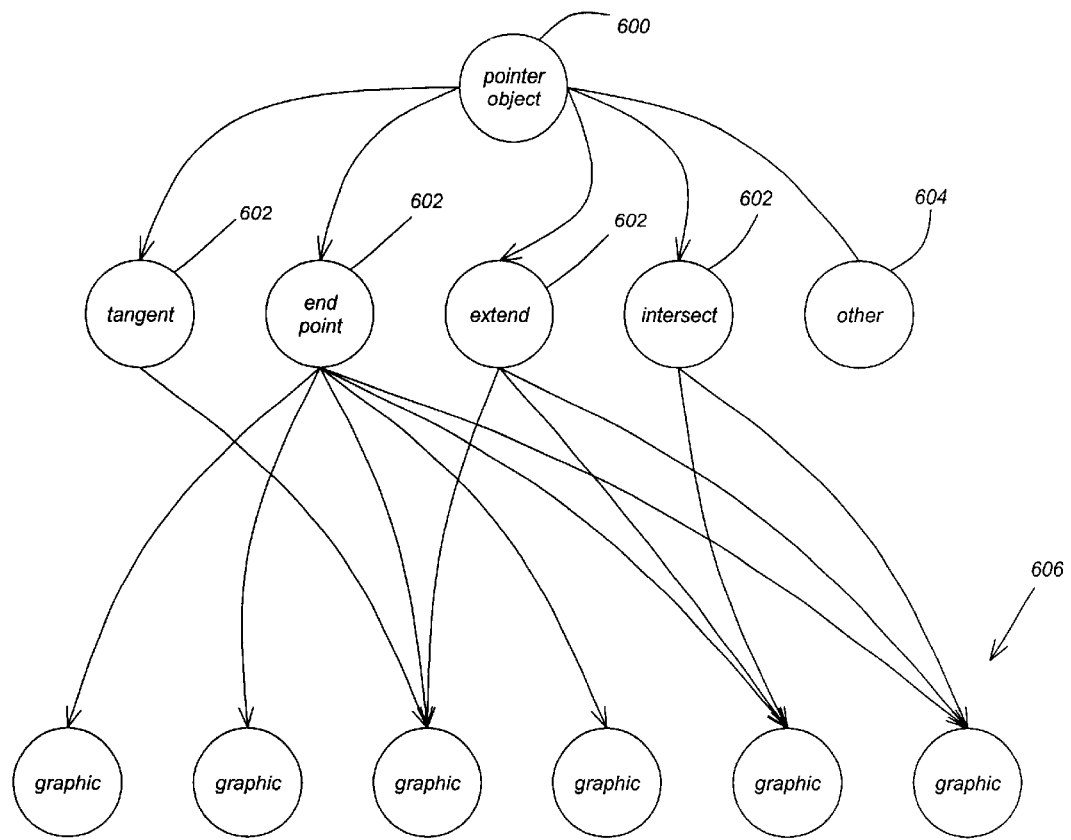
FIG. 6 is a block diagram that illustrates the general structure of a point generation application according to the preferred embodiment of the present invention.

FIG. 6 provides an example of how the present invention could be used to implement a function within a graphics program 118. The example of FIG. 6 uses the DMG Engine 204 to find interesting points in 3D space and the model provides a point generation function. In this example, a pointer object 600 moves in response to cursor movement events. The pointer object 600 also generates a GET_SNAPS event and sends it to its child nodes 602 and 604. The event is first filtered by an edge (connection) type. Events not filtered by the edge type are received by the child nodes 602 and 604. Child nodes 602 that are snap behavior nodes handle the event, while other nodes 602 ignore the event. Each snap behavior node 602 handles the event by iterating through its connected graphic nodes 604. Graphic nodes 604 can be as simple as graphic primitives (line, arc, solid, etc.) or as complex as "real world" objects (where interesting points, rotations, and orientations can be represented by graphic primitives). Graphic nodes 604 are filtered out if their spatial component is outside of a predetermined tolerance for the cursor movement. Graphic nodes 604 can also be filtered out by other predefined rules. Graphic nodes 604 that are not filtered return a set of snap components within a predefined tolerance and rule set. Snap components usually comprise a snap point, orientation, rotation, displayable primitives representing the calculation, etc. The pointer object 600 receives a list of all snap components and displays a "best" result. This model could be extended, for example, to implement a user interface where a graphic object 604 is associated with the pointer object 600 and, as the pointer object 600 moves, it generates "modify" events from the "best" snap component and sends them to the associated graphic object 604 to update itself.

In another example, the present invention could be used to provide intelligent point concepts to a CAD program, including geometric constraints such as tangent, parallel, offset, etc. As an illustration, the present invention might provide a point at the intersection of two planes in space, and could project a point that was offset by ten units in the vertical direction. The present invention could also constrain points of interest to an actual planar surface, such as a floor in an architectural design. Behaviors would handle the placement of objects with explicit constraints from another object, e.g., "stacked on" or "next to" the object. The CAD program would use the DMG Engine 204 to find interesting geometric relationships between two 3D graphics objects.

In still another example, the present invention could be used to automatically position 3D objects in a computer-generated graphics program to help create proposed designs. The present invention would provide a means to accurately constrain the interactive behavior of 3D objects, thereby removing almost all responsibility from the operator to manipulate the object to the correct location. This technique could be combined with other 3D graphics programs to create specialized graphics programs for architectural design, office layout, shop floor design, product maintenance procedures, etc. Most important to the acceptance by a wide customer base, it includes an authoring environment whereby an end user can easily create geometric constraints in their own 3D models. This product would use the DMG Engine 204 to find interesting graphical relationships between real world objects that often are displayed graphically, and have real relationships that must be met.

In still another example, the present invention could be used to expand the geometric constraints of the graphical program into logical behavior. It includes a variety of authoring techniques that assign behaviors to 3D objects such as "close to", "on top of", "behind", "inside", "looks good with", etc. The product will have the most appeal in context of simulations, quick layouts, realistic human interactions, etc., and will therefore stimulate applications in (Internet) retailing, virtual product experiences, computer games, etc. This product would use the DMG Engine 204 to find appropriate real world relationships between real world objects, taking into account all of the graphical and non-graphical constraints of these relationships.

Logic of the Directed Multi-graph Engine

Figure 7:
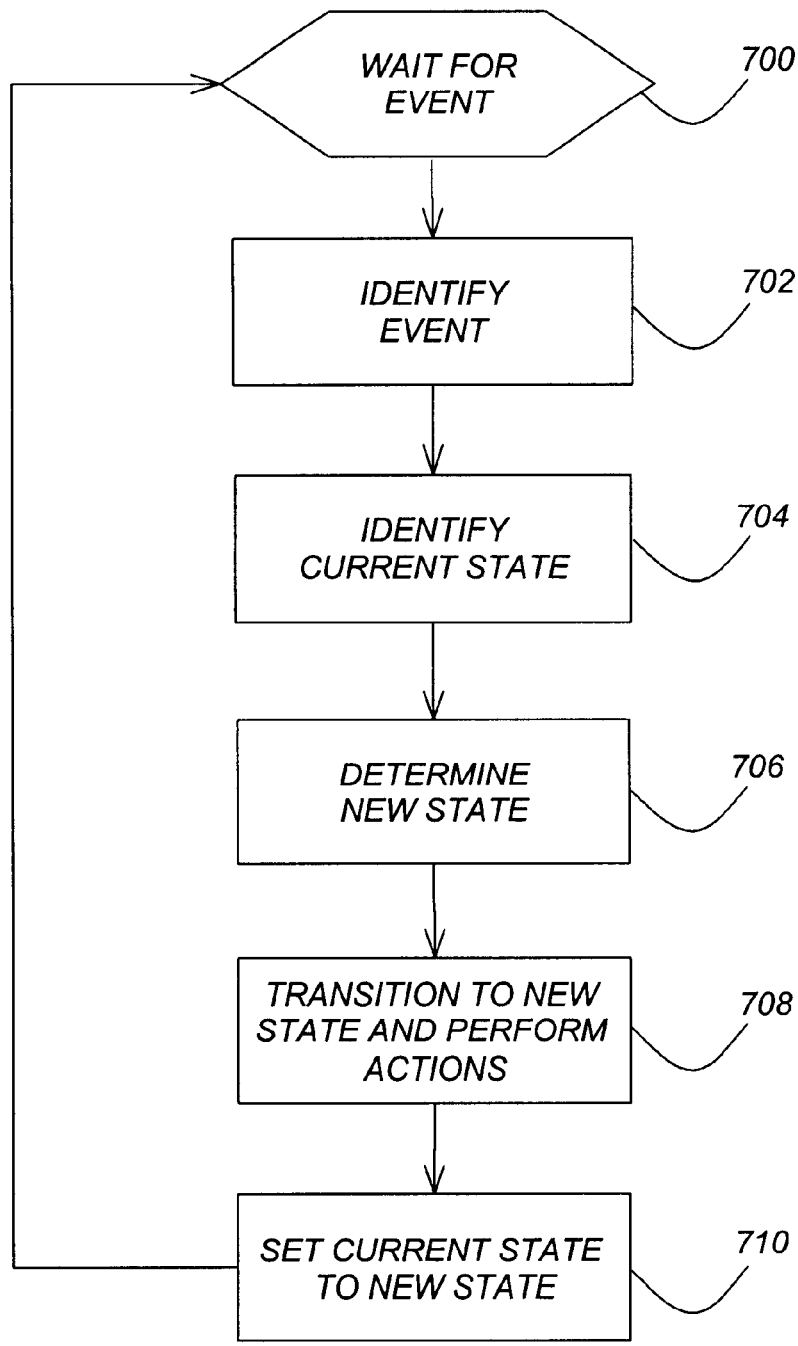
FIG. 7 is a flowchart that illustrates the general logic of an event-driven directed multi-graph engine performing the steps of the preferred, embodiment of the present invention.

FIG. 7 is a flowchart that illustrates the general logic of the Directed Multi-Graph Engine 204 according to the preferred embodiment of the present invention. Those skilled in the art will recognize that this logic is provided for illustrative purposes only and that different logic may be used to accomplish the same results. As the graphs are processed by the Directed Multi-Graph Engine 204, operations are performed when transitions are made, based upon the receipt of messages or events, from present or current states to new states.

Generally, the flowchart of FIG. 7 begins by waiting at block 700 for an event to occur, either externally or internally. When an event occurs, control passes to block 702 to identify the event. Based upon the event, as well as the current state of the graph being interpreted by the Directed Multi-Graph Engine 204 as determined in block 704, a new state is determined in block 706. In block 708, the logic transitions to the new state and performs any actions required for the transition, including the triggering of new events. In block 710, the current state is set to the previously determined new state, and control returns to block 700 to process more events.

The specific operations that are performed by block 708 when transitioning between states will vary depending upon the current state and the event. The various operations required to implement and maintain the preferred embodiment of the present invention represent particular events handled by the logic.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any program, function, or operating system providing graphical functions could benefit from the present invention.

In summary, the present invention discloses a computer-implemented method, apparatus, and article of manufacture for defining an object-oriented framework for describing three-dimensional (3D) graphical objects, systems, and simulations. An object, system, or simulation is implemented as a directed multi-graph that includes one or more nodes connected by zero or more edges. A directed multi-graph engine in a graphics computer program processes the directed multi-graphs, wherein each node defines a component of an object, system, or simulation, and the edges define relationships between the nodes. There are no restrictions on node types, and thus nodes may represent graphic objects (a visual representation), rules (rule-base behavior), attributes (data that does not affect the fundamental definition of the object), properties (data that affects the fundamental definition of the object), behaviors (methods), and finite state machines (a sequence of actions and states). There are no restrictions on edge types, and thus edges may represent events, connectivity (graphic and logical), data, and constraints. Events traverse the graph, wherein the edges determine if and how traversal of the nodes is performed and any node may perform some sequence of operations in response to this traversal and the state of the graph.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented graphics system, comprising:
   (a) a computer having an output device coupled thereto;
   (b) a database for storing dynamic representations of a three-dimensional (3D) graphical image, system, or simulation as a graph, wherein the graph is comprised of at least one node and the nodes may be connected by zero or more edges; and (c) an Image Engine (IME) for processing the 3D graphical image, system, or simulation stored in the database and for delivering the processed 3D graphical image, system results, and simulation results to the output device, wherein the Image Engine includes a Directed Multi-Graph (DMG) Engine for executing the graph stored in the database, each node in the graph defines a component designed to perform some specific function of the image, system, or simulation, the edges define relationships between the nodes, and events traverse the edges and the nodes of the graph, the edges determine whether and how the nodes are traversed, the nodes may perform at least one operation in response to the event traversal and a state of the graph, and the nodes are added to the graph and removed from the graph dynamically at runtime.

2. The system of claim 1, wherein the nodes define the components of the image, system, or simulation.

3. The system of claim 1, wherein the nodes are selected from a group comprising graphic objects, behaviors, rules, attributes, properties, finite state machines, finite state machine definitions, and user-defined types.

4. The system of claim 1, wherein the edges are selected from a group comprising event filters, connectivity, data, constraints, and user-defined types.

5. The system of claim 1, wherein the edges establish node-to-node relationships in the graph dynamically at runtime.

6. The system of claim 1, wherein an event propagates the graph by tracing the edges and nodes.

7. The system of claim 1, wherein an event is initiated externally from an application.

8. The system of claim 1, wherein an event is initiated internally from any node in a model.

9. The system of claim 1, wherein an event may cause a node to respond with a change of state and the node may perform some operation in response thereto.

10. The system of claim 9, wherein the response of a node to an event may change the relationship between any two nodes.

11. The system of claim 9, wherein the response of a node to an event may add, remove, or modify any other node.

12. The system of claim 1, wherein the graph is selected from a group comprising a simple graph, directed graph, cyclic graph, multi-graph, and cyclic multi-graph.

13. The system of claim 1, wherein the relationships between nodes may be driven by changes in the state of the nodes, the state of the image, the state of the system, or the state of the simulation.

14. A computer-implemented method of processing three-dimensional (3D) graphical images, systems, and simulations, comprising:

(a) storing a dynamic representation of a three-dimensional (3D) graphical image, system, or simulation as a graph in a database, wherein the graph is comprised of at least one node and the nodes may be connected by zero or more edges; and (b) processing the 3D graphical age, system, or simulation stored in the database in an Image Engine (IME) and delivering the processed 3D graphical image, system results, and simulation results to an output device, wherein the Image Engine includes a Directed Multi-Graph (DMG) Engine for executing the graphs stored in the database, each node in the graph defines a component designed to perform some specific function of the image, system, or simulation, the edges define relationships between the nodes, and events traverse the edges and the nodes of the graph, the edges determine whether and how the nodes are traversed, the nodes may perform at least one operation in response to the event traversal and a state of the graph, and the nodes are added to the graph and removed from the graph dynamically at runtime.

15. The method of claim 14, wherein the nodes define the components of the image, system, or simulation.

16. The method of claim 14, wherein the nodes are selected from a group comprising graphic objects, behaviors, rules, attributes, properties, finite state machines, finite state machine definitions, and user-defined types.

17. The method of claim 14, wherein the edges are selected from a group comprising event filters, connectivity, data constraints, and user-defined types.

18. The method of claim 14, wherein the edges establish node-to-node relationships in the graph dynamically at runtime.

19. The method of claim 14, wherein an event propagates the graph by tracing the edges and nodes.

20. The method of claim 14, wherein an event is initiated externally from an application.

21. The method of claim 14, wherein an event is initiated internally from any node in a model.

22. The method of claim 14, wherein an event may cause a node to respond with a change of state and the node may perform some operation in response thereto.

23. The system of claim 22, wherein the response of a node to an event may change the relationship between any two nodes.

24. The system of claim 22, wherein the response of a node to an event may add, remove, or modify any other node.

25. The method of claim 14, wherein the graph is selected from a group comprising a simple graph, directed graph, cyclic graph, multi-graph, and cyclic multi-graph.

26. The method of claim 14, wherein the relationships between nodes may be driven by changes in the state of the nodes, the state of the image, the state of the system, or the state of the simulation.

27. An article of manufacture embodying logic for performing a computer-implemented method of processing three-dimensional (3D) graphical images, systems, and simulations, the method comprising:

(a) storing a dynamic representation of a three-dimensional (3D) graphical image, system, or simulation as a graph in a database, wherein the graph is comprised of at least one node and the nodes may be connected by zero or more edges; and (b) processing the 3D graphical image, system, or simulation stored in the database in an Image Engine (IME) and delivering the processed 3D graphical image, system results, or simulation results to an output device, wherein the Image Engine includes a Directed Multi-Graph (DMG) Engine for executing the graphs stored in the database, each node in the graph defines a component designed to perform some specific function of the image, system, or simulation, the edges define relationships between the nodes, and events traverse the edges and the nodes of the graph, the edges determine whether and how the nodes are traversed, the nodes may perform at least one operation in response to the event traversal and a state of the graph, and the nodes are added to the graph and removed from the graph dynamically at runtime.

28. The method of claim 27, wherein the nodes define the components of he image, system, or simulation.

29. The method of claim 27, wherein the nodes are selected from a group composing graphic objects, behaviors, rules, attributes, properties, finite state machines, finite state machine definitions, and user-defined types.

30. The method of claim 27, wherein the edges are selected from a group comprising event filters, connectivity, data, constraints, and user-defined types.

31. The method of claim 27, wherein the edges establish node-to-node relationships in the graph dynamically at runtime.

32. The method of claim 27, wherein an event propagates the graph by tracing the edges and nodes.

33. The method of claim 27, wherein an event is initiated externally from an application.

34. The method of claim 27, wherein an event is initiated internally from any node in a model.

35. The method of claim 27, wherein an event may cause a node to respond with a change of state and the node may perform some operation in response thereto.

36. The system of claim 35, wherein the response of a node to an event may change the relationship between any two nodes.

37. The system of clam 35, wherein the response of a node of an event may add, remove, or modify any other node.

38. The method of claim 27, wherein the graph is selected from a group comprising a simple graph, directed graph, cyclic graph, multi-graph, and cyclic multi-graph.

39. The method of claim 27, wherein the relationships between nodes may be driven by changes in the state of the nodes, the state of the image, the state of the system, or the state of the simulation.

\* \* \* \* \*

UNITED STATES PATENT AND TRADEMARK OFFICE
CERTIFICATE OF CORRECTION

PATENT NO.    : 6,823,299 B1
DATED         : November 23, 2004
INVENTOR(S)   : Alfredo Contreras et al.

It is certified that error appears in the above-identified patent and that said Letters Patent is hereby corrected as shown below:

<u>Column 11,</u>
Line 2, "he" should read -- the --.
Line 4, "composing" should read -- comprising --.

Signed and Sealed this

Fifteenth Day of March, 2005

JON W. DUDAS
*Director of the United States Patent and Trademark Office*